United States Patent [19]
Norris

[11] Patent Number: 6,078,750
[45] Date of Patent: Jun. 20, 2000

[54] DUAL EXPOSURE PHOTOGRAPHIC APPARATUS AND METHOD OF OPERATING SAME

[75] Inventor: Philip R. Norris, North Reading, Mass.

[73] Assignee: Polaroid Corporation, Cambridge, Mass.

[21] Appl. No.: 09/018,752

[22] Filed: Feb. 4, 1998

Related U.S. Application Data

[63] Continuation-in-part of application No. 08/918,717, Aug. 22, 1997, which is a continuation-in-part of application No. 08/738,772, Oct. 29, 1996, Pat. No. 5,838,999.

[51] Int. Cl.$^7$ ............................ G03B 17/52; G03B 19/06
[52] U.S. Cl. ........................... 396/33; 396/284; 396/334; 396/446
[58] Field of Search .................................. 396/30, 31, 32, 396/33, 34, 35, 36, 37, 38, 39, 40, 41, 284, 333, 334, 446

[56] References Cited

U.S. PATENT DOCUMENTS

| | | | |
|---|---|---|---|
| 661,504 | 11/1900 | Ehlman | 430/501 |
| 1,251,766 | 1/1918 | Gindele | 430/501 |
| 1,524,508 | 1/1925 | Cohen | 430/500 |
| 2,590,678 | 3/1952 | Caim | 430/501 |
| 3,047,387 | 7/1962 | Land | 96/48 |
| 3,183,809 | 5/1965 | Nerwin | 396/41 |
| 3,270,653 | 9/1966 | Bachelder | 95/89 |
| 3,283,683 | 11/1966 | Land | 95/13 |
| 3,314,792 | 4/1967 | Land | 96/76 |
| 3,449,046 | 6/1969 | White | 355/40 |
| 3,455,692 | 7/1969 | Bachelder et al. | 96/78 |
| 3,631,773 | 1/1972 | Moodie | 95/1.1 |
| 3,636,845 | 1/1972 | Harvey | 93/13 |
| 3,643,570 | 2/1972 | Reid et al. | 95/18 |
| 3,673,939 | 7/1972 | Harvey | 95/13 |
| 3,754,917 | 8/1973 | Harvey | 96/76 |
| 4,200,383 | 4/1980 | Bendoni et al. | 354/304 |
| 4,212,528 | 7/1980 | Mason | 354/317 |
| 4,248,510 | 2/1981 | Baker et al. | 354/109 |

(List continued on next page.)

FOREIGN PATENT DOCUMENTS

| | | |
|---|---|---|
| 26 57 423 A1 | 12/1976 | Germany. |
| 52-44629 | 7/1977 | Japan. |
| 63-10322 | 7/1988 | Japan. |

OTHER PUBLICATIONS

PCT International Search Report, mailed Feb. 16, 1998, PCT/US 97/19398.
PCT International Search Report, mailed Feb. 16, 1998, PCT/US 97/19397.

*Primary Examiner*—Alan A. Mathews
*Attorney, Agent, or Firm*—Donald F. Mofford

[57] ABSTRACT

A camera according to the present invention includes a first cavity to accommodate conventional film material having multiple frames, each frame having a corresponding indicia disposed on the conventional film material to identify the corresponding frame and a second cavity to accommodate self-developable film material having multiple image forming portions, each image forming portion having a corresponding indicia disposed on the self-developable film material to identify the corresponding image forming portion and a corresponding frame of conventional film material. The camera further includes a light path for exposing simultaneously one of the multiple frames of the conventional film material and one of the multiple image forming portions of the self-developable film material.

8 Claims, 6 Drawing Sheets

U.S. PATENT DOCUMENTS

| | | | |
|---|---|---|---|
| 4,291,966 | 9/1981 | Bendoni et al. | 354/275 |
| 4,370,045 | 1/1983 | Holmes | 354/304 |
| 4,488,794 | 12/1984 | Dolgow et al. | 354/83 |
| 4,569,578 | 2/1986 | Stella et al. | 354/76 |
| 4,605,608 | 8/1986 | Bullitt | 430/206 |
| 4,660,951 | 4/1987 | Reed et al. | 354/187 |
| 4,693,576 | 9/1987 | Chen | 354/86 |
| 4,884,088 | 11/1989 | Mauchan | 354/86 |
| 4,951,073 | 8/1990 | Slavitter | 354/110 |
| 4,962,398 | 10/1990 | Sorg et al. | 354/86 |
| 5,001,502 | 3/1991 | Douglas | 354/86 |
| 5,023,636 | 6/1991 | Douglas | 354/86 |
| 5,040,009 | 8/1991 | Kazunori | 354/275 |
| 5,049,910 | 9/1991 | Hsiung | 354/210 |
| 5,073,464 | 12/1991 | Osawa | 430/30 |
| 5,103,249 | 4/1992 | Keene | 354/85 |
| 5,285,894 | 2/1994 | Kazuo et al. | 206/316.1 |
| 5,292,612 | 3/1994 | Polizzotto et al. | 430/207 |
| 5,440,366 | 8/1995 | Reiss et al. | 354/301 |
| 5,453,804 | 9/1995 | Norris et al. | 354/83 |

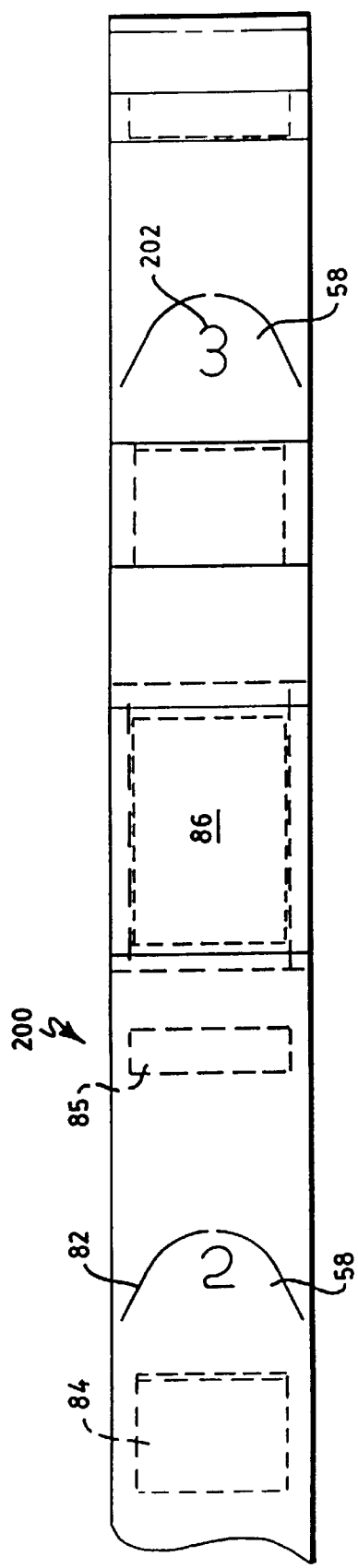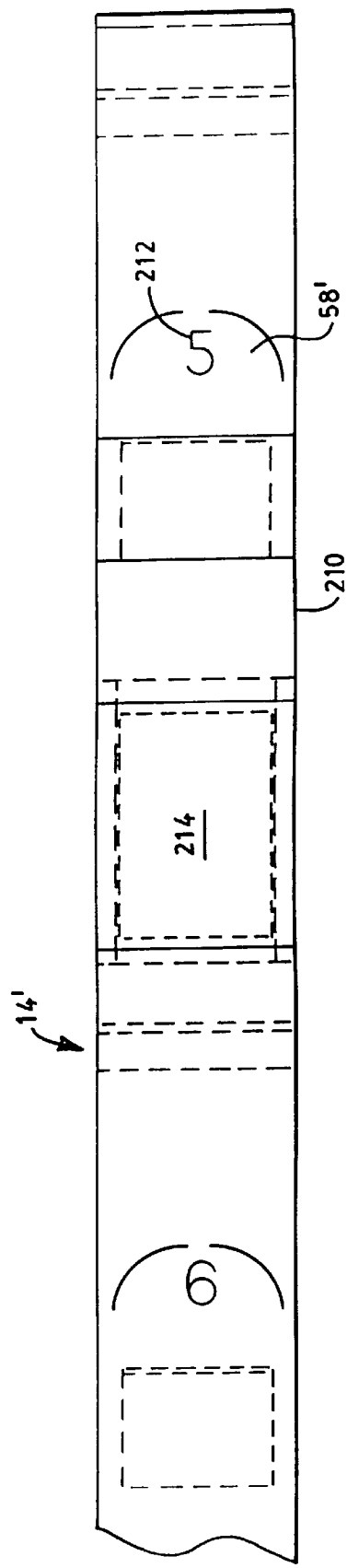

6,078,750

DUAL EXPOSURE PHOTOGRAPHIC APPARATUS AND METHOD OF OPERATING SAME

CROSS-REFERENCE TO RELATED APPLICATIONS

The present application is a continuation-in-part application of U.S. patent application Ser. No. 08/918,717 filed on Aug. 22, 1997 which is a continuation-in-part application of U.S. patent application Ser. No. 08/738,772 filed Oct. 29, 1996, now U.S. Pat. No. 5,838,999 and related to co-pending U.S. patent application Ser. No. 08/808,040 filed Mar. 4, 1997.

BACKGROUND OF THE INVENTION

The present invention relates to photographic apparatus and methods in general and, more particularly, to photographic cameras whereby exposures of self-developable and photographic film are taken simultaneously such that an operator is presented with a self-developed image corresponding to the image captured simultaneously by the exposed photographic film.

Users of conventional photographic cameras are only able to obtain information as to the scene image captured by having it developed by a photo-finisher or photolab. Of course with the advent of instant photography, self-developable film cameras allow a user to obtain such scene information immediately. Despite the achievement of the latter development, there is nevertheless a desire to provide users of photographic cameras with a developed instant image corresponding to the scene exposed on the photographic film to provide a positive proof of the image captured by the photographic film as taught in commonly assigned U.S. patent application Ser. No. 08/918,717, entitled "Dual Exposure Photographic Apparatus and Method" and filed on Aug. 22, 1997, herein incorporated by reference and commonly assigned U.S. patent application Ser. No. 08/738,772, entitled "Dual Exposure Photographic Apparatus and Method" filed Oct. 29, 1996, herein incorporated by reference. Furthermore, commonly assigned U.S. patent application Ser. No. 08/808,040, entitled "Photographic Apparatus and Method" filed Mar. 4, 1997, is herein incorporated by reference. Accordingly, a user can have such information and use it for a variety of purposes, such as assessing the image previously taken.

While dual camera photography exists in which it is known to simultaneously expose both instant and photographic films either with single or dual cameras, there does not exist a photographic camera for permitting dual exposures of both photographic and self-developable films in a compact and economical manner let alone in a single-use camera arrangement.

SUMMARY OF THE INVENTION

A camera according to the present invention includes a first cavity to accommodate conventional film material having multiple frames, each frame having a corresponding indicia disposed on the conventional film material to identify the corresponding frame and a second cavity to accommodate self-developable film material having multiple image forming portions, each image forming portion having a corresponding indicia disposed on the self-developable film material to identify the corresponding image forming portion and a corresponding frame of conventional film material. The camera further includes a light path for exposing simultaneously one of the multiple frames of the conventional film material and one of the multiple image forming portions of the self-developable film material. With such an arrangement, an user can preview images from the self-developable film material and from the indicia associated with the images, instruct a film processing center as to which frames of the conventional film material the user wishes to have pictures made.

In accordance with a further aspect of the present invention, the camera further includes viewing one of the indicia disposed on the self-developable film material to identify that one of the image forming portions of the self-developable film material and that frame of the conventional film material ready for exposure. With such an arrangement, a user is reminded as to the number of pictures taken on the conventional film material and made aware of the remaining images that may be captured by the self-developed film material and the conventional film material.

In accordance with a still further aspect of the present invention, the camera includes disposing the indicia disposed on the self-developable film material external to the camera to identify that one of the image forming portions of the self-developable film material and that frame of the conventional film material ready for exposure. With such an arrangement, a low cost camera is provided with reduced number of parts by having a flap used to advanced the conventional film material while removing the image forming portions of the self-developable film also include the indicia, here numerals, to indicate which frame and image forming portion is ready for exposure.

BRIEF DESCRIPTION OF THE DRAWINGS

For a more complete understanding of this invention, reference is now made to the following description of the accompanying drawings, wherein:

FIG. 7 is a view illustrating the image forming portions of the self-developable film material and location of the indicia on the self-developable film material; and FIG. 8 is an alternative view illustrating the image forming portions of the self-developable film material and location of the indicia on the self-developable film material.

DESCRIPTION OF THE PREFERRED EMBODIMENT

Figure 1:
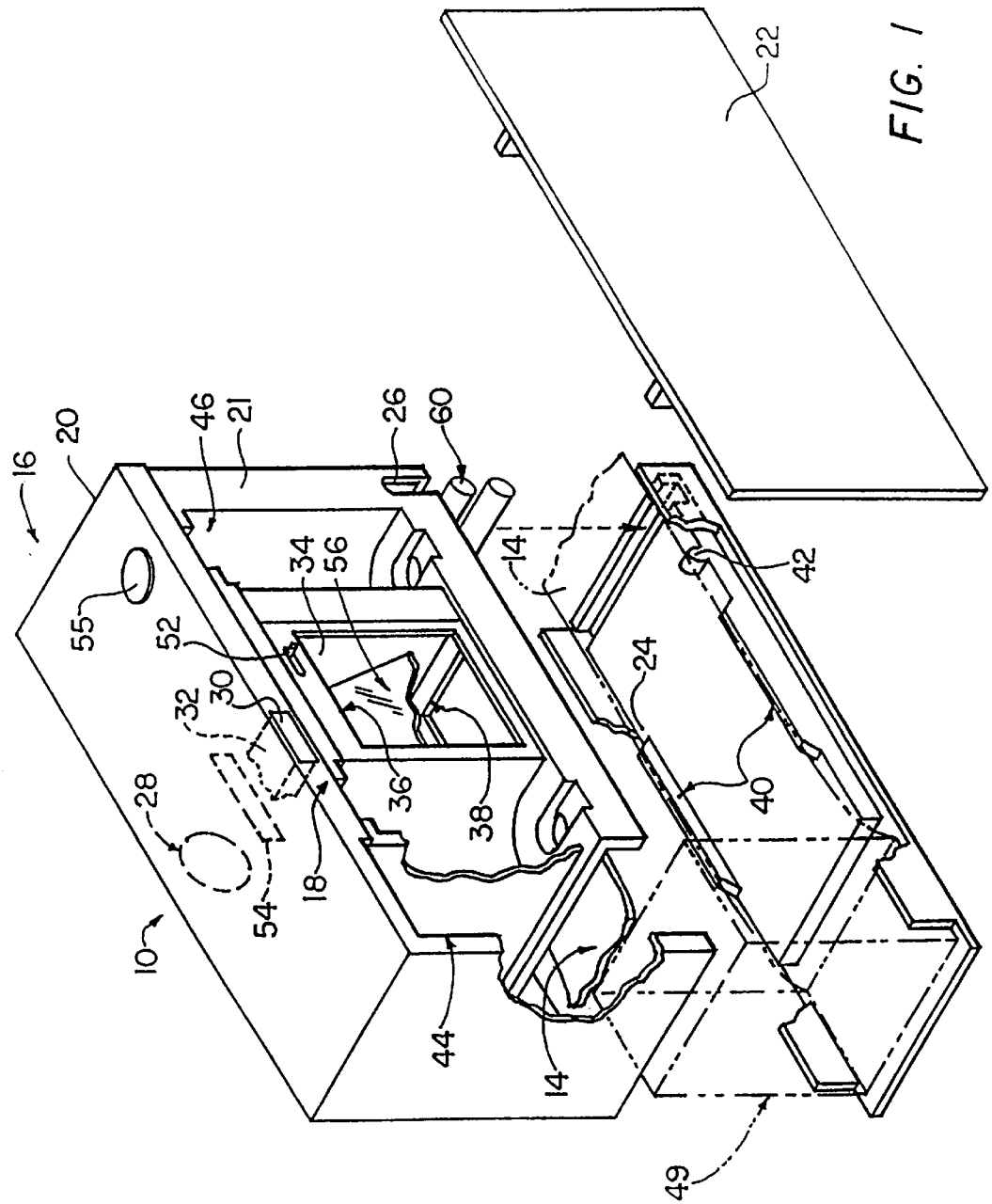
FIG. 1 is a schematic exploded perspective of an improved film camera made in accordance with the principles of the present invention.
Figure 2:
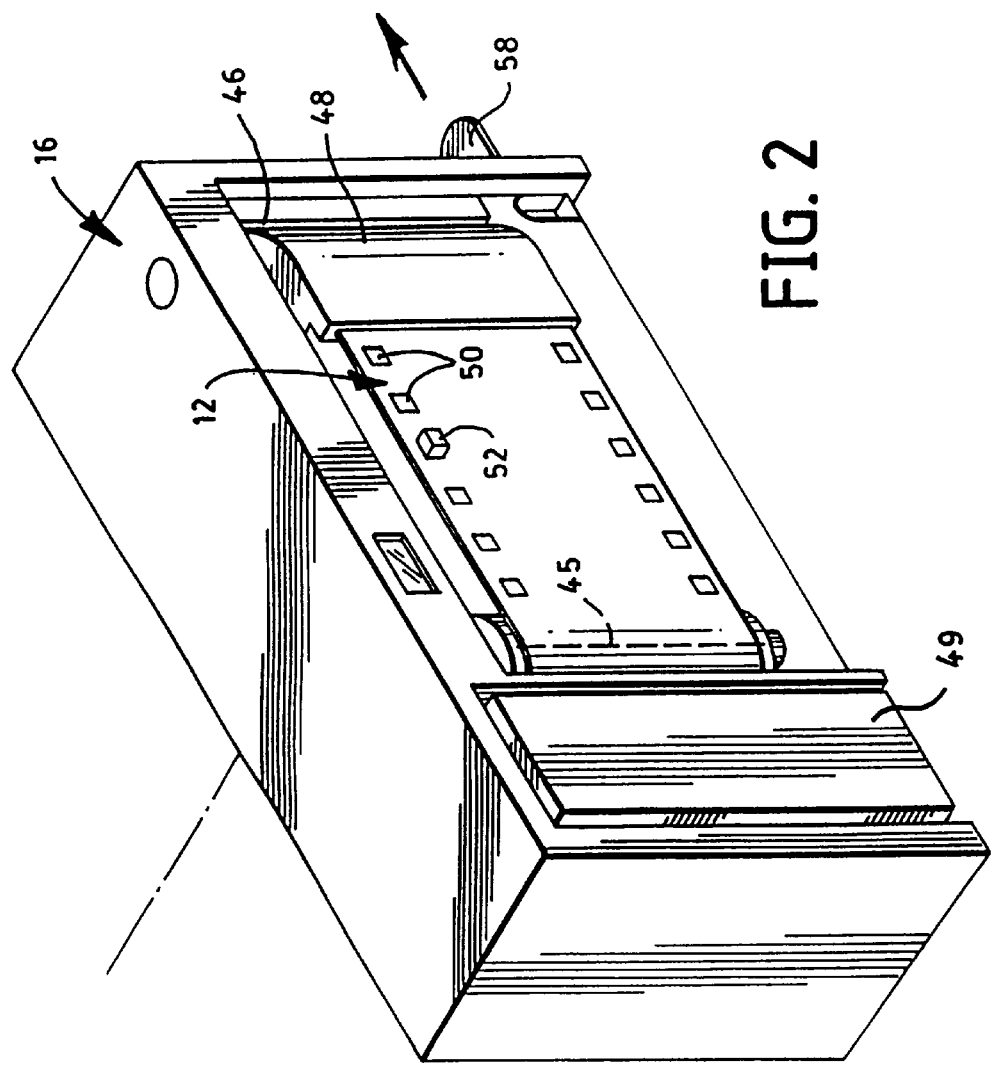
FIG. 2 is a schematic illustrating such photographic apparatus with the films loaded therein.

Reference is now made to FIGS. 1 and 2 for schematically illustrating one preferred embodiment of a photographic camera apparatus, preferably a disposable or single-use type, being represented generally by reference numeral 10. The camera 10 apparatus is adapted for exposing dual images, wherein one is on conventional photographic film 12, such as 35 mm, and the other is on self-developable or instant film 14 of the diffusion transfer type. The photographic apparatus or camera 10 includes a light tight housing assembly 16 or means for housing a supply of the self-developable film 14 and having disposed therein a camera subassembly 18 adapted for taking exposures of, for example 35 mm conventional photographic film. It should appreciated that in an alternative embodiment 110 type film could be used. While the preferred camera 10 is described for a single-use photographic apparatus, wherein the films are already packaged therein, it will be understood that the present invention also envisions that the camera 10 can be recyclable and indeed reusable.

With continued reference to FIGS. 1 and 2, the housing assembly 16 includes a main or front casing 20, a back cover 22, preferably detachable couplable thereto for covering an opening 21 in the front casing 20, and a bottom cover 24 also detachable couplable to the front casing 20 to define a light tight housing. The front casing 20 includes a film exiting aperture which is defined as an elongated opening 26 that permits the instant film to be pulled manually therefrom as well as adequately seals light from the interior of the camera housing.

The camera 10 has a taking lens 28, and a rear viewfinder eyepiece 30 for a viewfinder assembly 32. The front casing 20 defines an exposure chamber 34, an exposure aperture 36 for the conventional film 12 and an exposure aperture 38 for the instant film 14. The bottom cover 24 includes a pair of longitudinally extending ribs 40 along at least an intermediate portion of each side thereof as well as a traverse supporting rib 42 which acts to also support the film during such travel and permits the film to slip after the 35 mm film is stopped as will be explained later. The front casing 20 includes a pair of conventional film holding cavities 44 and 46. Convolutions of the rolled unexposed conventional film are mounted on a spool 45 in cavity 44. A conventional 35 mm cassette 48 is adapted to be received within the cavity 46. The sprockets 50 of the film 12 are sequentially engaged by one of a plurality of shutter recock teeth 52 on a recock wheel which protrudes from the front casing. In the present embodiment, a shutter mechanism 54 is generally illustrated herein and is actuated in response to an operator actuating an actuator button 55. The shutter mechanism 54 is set to control a single exposure interval and can be of any known type. For example, the exposure control system can be like that found in conventional single-use 35 mm cameras; an example of one is sold by Polaroid Corporation under the trademark SIDE-KICK®. The shutter mechanism 54 is recocked in response to advancement of the roll of conventional film 12. Advancement of the conventional film 12 will in the present embodiment be done in response to advancement of the instant film 14. The shutter recocking teeth 52 is engagable with individual sprockets 50 of the film 12, whereby as the film is advanced from one frame to the next, the shutter teeth 52 is moved. Movement of the shutter teeth 52 continues until the recocking wheel is stopped, whereupon the shutter mechanism is recocked and the film 12 has appropriately advanced a single frame.

For effecting frame-by-frame displacement of the photographic and instant films, the instant film 14 is manually pulled from the camera housing 16. In this connection, a leading tab 58 (FIG. 2) of the instant film protrudes from the camera housing 16. The assemblage is storable in the cassette 49 and is gradually withdrawn by pulling actions placed by the user at the tab 58. In this embodiment, the film 14 is appropriately folded as by z-folds, so that successive frames exit the cassette 49 and travel along a path, as illustrated in the drawings, past the second exposure aperture 38 to the spread roller assembly 60; and, ultimately out the film exit opening 26.

Figure 3:
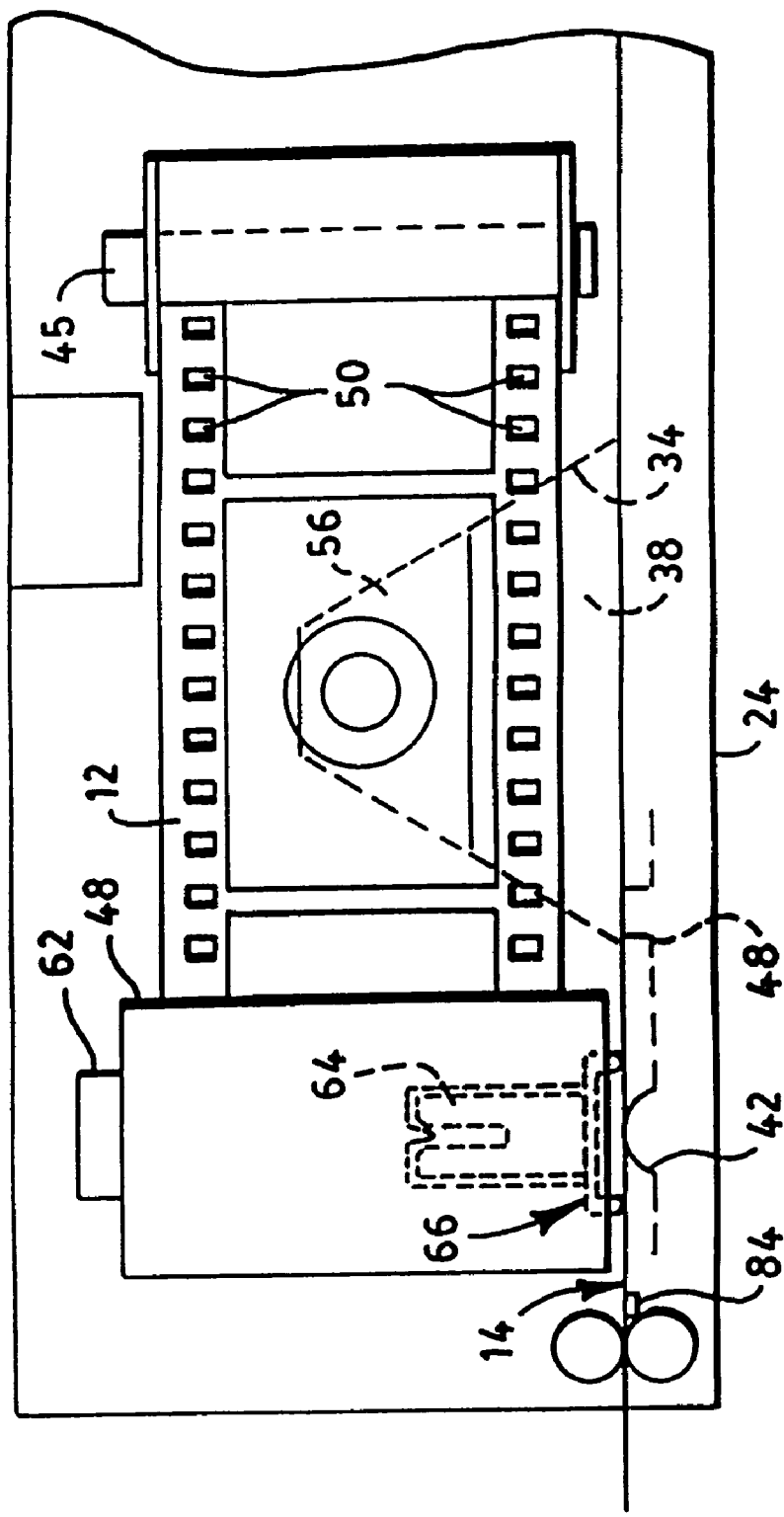
FIG. 3 is a schematic side elevation view illustrating the camera with some of the components missing to thereby better illustrate still other components of the camera.

Referring now also to FIG. 3, it will be seen that the 35 mm film cassette is spring biased by a spring 62 that is mounted in the front casing 20. The spring 62 urges also the instant film 14 into engagement with the slip surface on the slip tab 42. A coupling plug 64 fits within a spool receiving portion of the cassette 48 and is coupled thereto for movement therewith, whereby the plug 64 and thus the film in the cassette 48 rotate in response to linear advancement of the instant film 14. The coupling plug 64 is provided with a circular crown member 66 at a distal end thereof which engages the instant film and urges the latter into engagement with the slip surface on the tab 42 under the bias of the spring 62. Hence, as the instant film 14 is pulled along the illustrated path, it rotates the crown member 66 and thus the film 12 in the 35 mm cassette. The film 12 in the 35 mm cassette 48 will continue to rotate until the shutter mechanism stops such movement thereof by virtue of preventing further movement of the recock wheel. This will occur, after a frame of the conventional film 12 is advanced frame-by-frame to the image plane. The slip surface, however, allows continued pulling on the instant film 14. Accordingly, the instant film 14 is allowed to continue to advance to the exit opening 26. Although the present embodiment illustrates a slip rib 42, the use of other similar devices may be utilized, such as clutch-like devices for allowing continued movement of the instant film 14 even after the film 12 in the cassette 48 stops rotation. Furthermore, although a coupling plug 64 is disclosed, it should be understood that there are also a number of approaches that can be used to effect translation of the linear movement of the instant film 14 to rotational movement of the film 12 in the film cassette 48.

Figure 4:
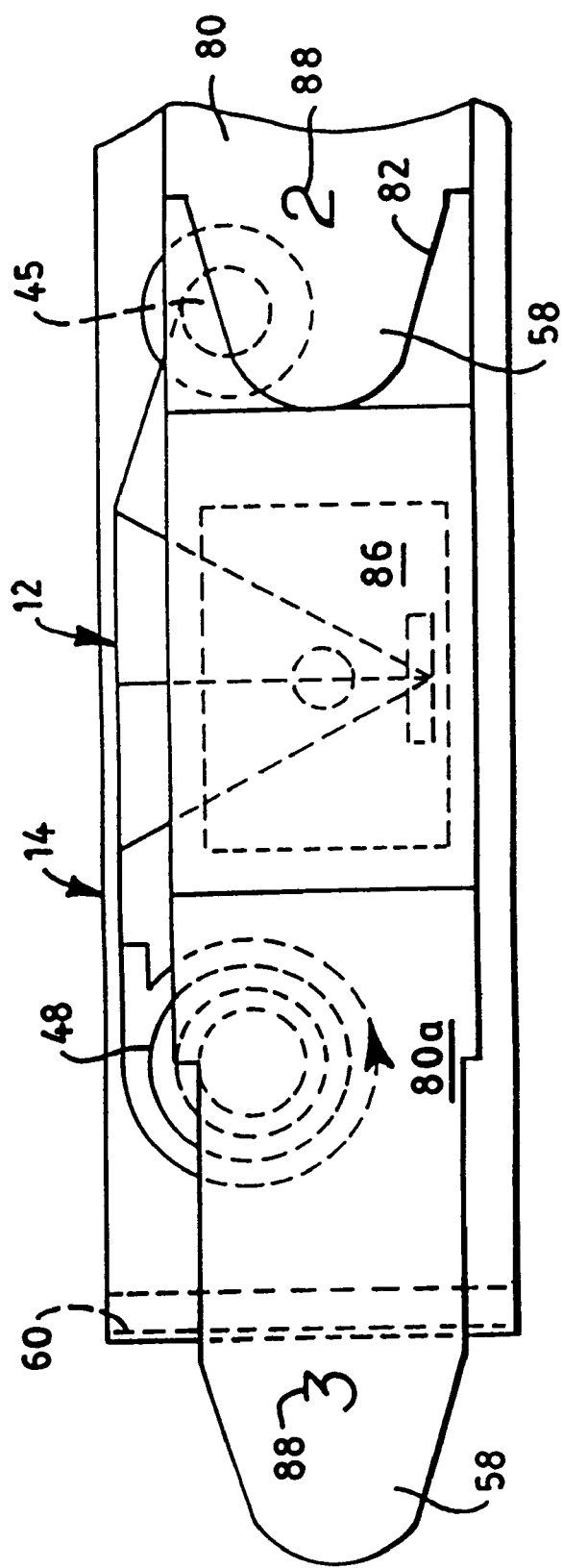
FIG. 4 is schematic view illustrating still other components of the camera.

Reference is now made to FIG. 4 for illustrating one preferred film assemblage 14 of the instant type for use in providing the instant proof of the simultaneously exposed conventional film unit or camera 10. The film assemblage 14 includes a plurality of attached together image forming assemblies of the integral film of the diffusion transfer type. It will be appreciated that each of the image forming assemblies will be constructed in a similar fashion and be arranged in an end-to-end relationship. The image forming assembly frame includes a pair of spaced apart positive masking sheet members 80 and 80a, each having a generally rectangular configuration and being made of a suitable masking material; such as polyester or paper and the like and having coated on one surface thereof a heat sealable layer (not shown) as a part thereof. Each of the masking members includes a perforated area 82. The perforated area 82 has a predetermined strength that is selected to tear in response to a reaction force created by a brake or stopping member 84 (FIG. 7). The perforated area 82 function as frangible means and will permit the separation of successive image forming assemblies. Accordingly, each image forming frame 86 is located between the perforated areas 82. Indicia 88 is placed on each leading tab portion 58 for indicating, among other things, the frame number of the corresponding photographic image. This is advantageous since it eliminates the requirement for the camera 10 to have a mechanical film counter. The entire film assemblage is comprised of a series of interconnected and alternating series of receiving sheets or frames of the integral diffusion transfer type. A suitable trap 85 (FIG. 7) is placed on a leading edge of the mask member 80. As noted, each of the generally elongated and rectangular brake members 84 (FIG. 7) is mounted on each mask just behind each of the tab portions. The brake member 84 inhibits the passage of the film assemblage 14 through the processing rollers with sufficient resistance that when the brake member 84 engages the rollers, a pulling action of the user thereon will cause the perforations 82 to separate.

It should now be apparent when a user pulls on tab 58, as self-developable film 14 advances, conventional film 12 also advances until the next frame of conventional film 12 is properly located in the exposure chamber. The user continues to pull on self-developable film 14 until the brake member 84 inhibits the movement of self-developable film 14 and that portion, mask member 80a, of the self-developable film 14 in the hands of the user is separated at perforation 82 from the rest of the self-developable film 14. The user is then ready to take another picture and once having taken a picture, again pulls on tab 58 to advance the conventional film 12 as well as the self-developable film 14.

Figure 5A:
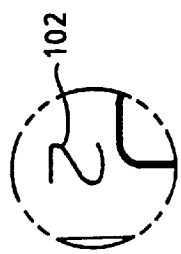
FIG. 5 is a view illustrating a typical frame location and location of the indicia of conventional film material.
Figure 5:
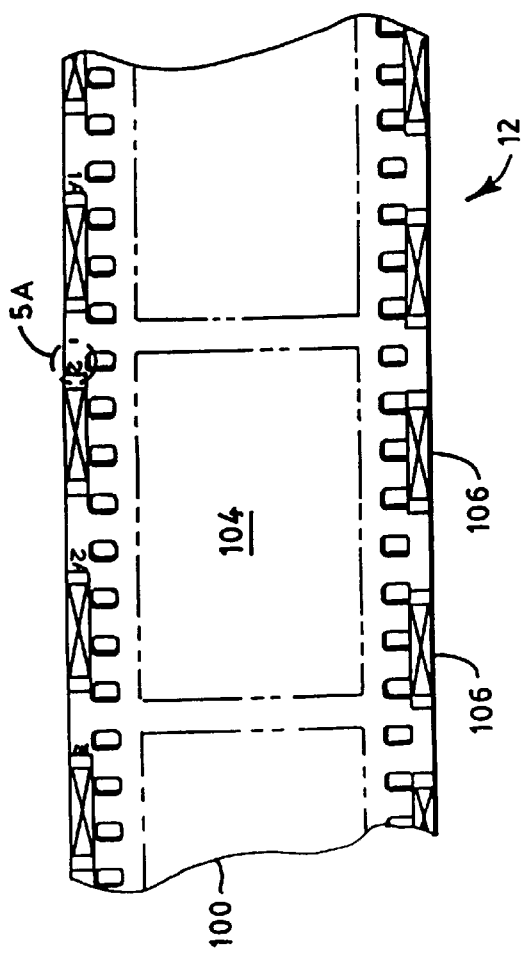

Referring now to FIG. 5, a portion 100 of conventional film 12 of the 35 mm type is shown. Indicia 102, here the numeral "2", is disposed on the outer periphery of the conventional film 12 to identify a corresponding frame 104. Additionally, bar code information 106 is also disposed on the outer periphery to provide information regarding the conventional film 12 to the processing lab. Using the indicia 102, a user can identify a corresponding frame 104 to the processing lab.

Figure 6:
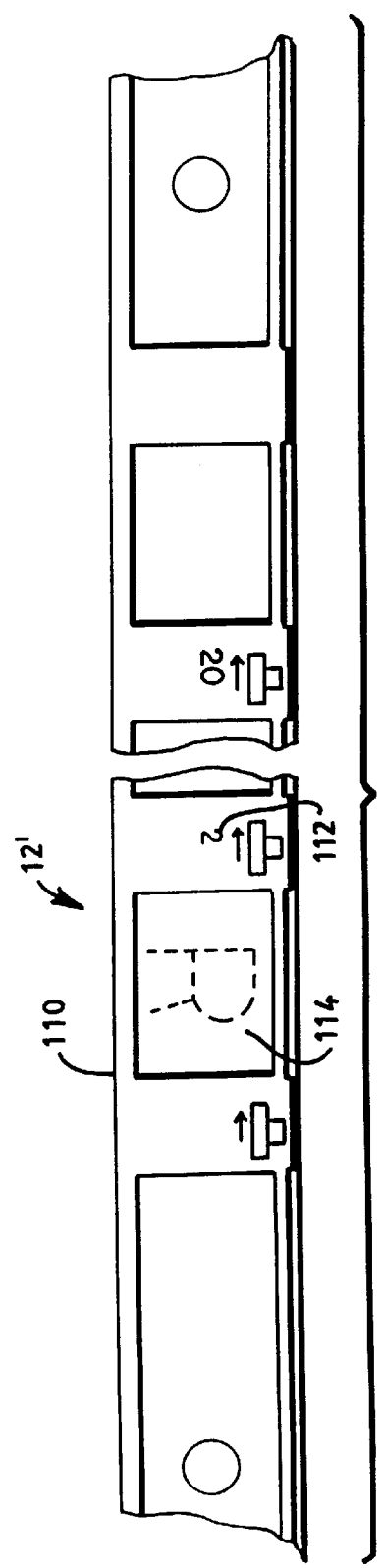
FIG. 6 is an alternative view illustrating a typical frame location and location of the indicia of conventional film material.

Referring now to FIG. 6, a portion 110 of conventional film 12' of the 110 type film is shown. Indicia 112, here the numeral "2", is disposed on the outer periphery of the conventional film 12' to identify a corresponding frame 114. Again, using the indicia 112, a user can identify a corresponding frame 114 to the processing lab.

Referring now to FIG. 7, a portion 200 of self-developable film 14 contemplated by the present invention is shown. Indicia 202, here the numeral "3", is disposed on the tab 58 of the self-developable film 14 to identify a corresponding frame 86. Here, the numbers are shown counting down as contemplated in a single-use application. Using the indicia 202, a user can identify the corresponding frame 104 (FIG. 5) on the conventional film 12 (FIG. 5) which corresponds to frame 86 to the processing lab.

Referring now to FIG. 8, a portion 210 of self-developable film 14' contemplated by the present invention is shown. Indicia 212, here the numeral "5", is disposed on the tab 58' of the self-developable film 14' to identify a corresponding frame 214. Here, the numbers are shown counting up as contemplated in a reloadable 35 mm use application or a 110 type film application. Using the indicia 212, a user can identify the corresponding frame 114 (FIG. 6) on the conventional film 12' (FIG. 6) which corresponds to frame 214 to the processing lab.

As described above, the indicia 88 is placed on each leading tab portion 58 for indicating the frame number of the corresponding photographic image of the self-developable film 14. The numerals of indicia 88 are numbered to correspond with the numbering of the frames 104 of the conventional film 12. This is advantageous since it eliminates the requirement for the camera 10 to have a mechanical film counter. Furthermore, once the supply of self-developable film 14 and conventional film 12 is consumed, the user can associate specific frames 104 of the conventional film 12 with the specific frames 86 of the self-developable film 14. Thus the user, when communicating with the processing lab, can instruct which frames 104 of the conventional film 12 the user wishes to have certain photographs made.

Having described the invention, it will now be apparent to one of skill in the art that changes may be made without departing from the concept of providing a light path for exposing a single frame of conventional film material having multiple frames, each frame having a corresponding indicia disposed on the conventional film material to identify the corresponding frame and, simultaneously, exposing an image forming portion of self-developable film material, each image forming portion having a corresponding indicia disposed on the self-developable film material to identify the corresponding image forming portion and the single frame of conventional film material exposed simultaneously. It is felt therefore, that this invention should not be restricted to its disclosed embodiment, but rather should be limited only by the spirit and scope of the appended claims.

What is claimed is:

1. A camera comprising:

first means for exposing a single frame of conventional film material having multiple frames, each frame having a corresponding indicia disposed on the conventional film material to identify the corresponding frame;

second means, simultaneously with the first means, for exposing an image forming portion of self-developable film material, each image forming portion having a corresponding indicia disposed on the self-developable film material to identify the corresponding image forming portion and the single frame of conventional film material exposed simultaneously; and means for viewing one of the indicia disposed on the self-developable film material to identify that one of the image forming portion of self-developable film material and that single frame of the conventional film material ready for exposure.

2. The camera as recited in claim 1 wherein the indicia are numbers numbered in ascending order.

3. The camera as recited in claim 1 wherein the indicia are numbers numbered in descending order.

4. A camera comprising:

first means for housing conventional film material having multiple frames, each frame having a corresponding indicia disposed on the conventional film material to identify the corresponding frame;

second means for housing self-developable film material having multiple image forming portions, each image forming portion having a corresponding indicia disposed on the self-developable film material to identify the corresponding image forming portion and a corresponding frame of conventional film material; and means for viewing one of the indicia disposed on the self-developable film material to identify that one of the image forming portions of the self-developable film material and that frame of the conventional film material ready for exposure.

5. The camera as recited in claim 4 wherein the means for viewing comprises disposing the indicia disposed on the self-developable film material external to the camera to identify that one of the image forming portions of self-developable film material and that frame of the conventional film material ready for exposure.

6. A camera comprising:

first supply means for supplying a strip of conventional film material having discrete exposable portions spaced apart in end-to-end relationship, each one of the exposable portions having corresponding indicia disposed on the film material to identify that exposable portion; and second supply means for supplying a strip of self-developable material having a plurality of discrete and spaced apart image forming portions and corresponding intermediate material which are joined together in end-to-end relationship, each one of the corresponding intermediate material having indicia disposed thereon to identify that image forming portion;

means for exposing simultaneously one of the discrete exposable portions of the conventional film material and one of the image forming portions of the self-developable material;

means for viewing the indicia disposed on one of the corresponding intermediate material, said viewed indicia identifying that one of the discrete exposable portions exposed simultaneously with the corresponding one of the image portions of the self-developable material.

7. A camera comprising:

a first cavity to accommodate conventional film material having multiple frames, each frame having a corresponding indicia disposed on the conventional film material to identify the corresponding frame;

a second cavity to accommodate self-developable film material having multiple image forming portions, each image forming portion having a corresponding indicia disposed on the self-developable film material to identify the corresponding image forming portion and a corresponding frame of conventional film material;

means for exposing simultaneously one of the multiple frames of the conventional film material and one of the multiple image forming portions of the self-developable film material; and means for viewing one of the indicia disposed on the self-developable film material to identify that one of the image forming portions of the self-developable film material and that frame of the conventional film material ready for exposure.

8. The camera as recited in claim 7 wherein the means for viewing comprises disposing the indicia disposed on the self-developable film material external to the camera to identify that one of the image forming portions of self-developable film material and that frame of the conventional film material ready for exposure.

* * * * *